(12) United States Patent
Waldner et al.

(10) Patent No.: US 7,326,352 B2
(45) Date of Patent: Feb. 5, 2008

(54) WATER TREATMENT SYSTEM

(75) Inventors: Sam G. Waldner, Stratford, SD (US); Will Westerman, Stratford, SD (US)

(73) Assignee: CZL Acquisition, LLC, Calhoun, GA (US)

(*) Notice: Subject to any disclaimer, the term of this patent is extended or adjusted under 35 U.S.C. 154(b) by 321 days.

(21) Appl. No.: 11/001,535

(22) Filed: Dec. 1, 2004

(65) Prior Publication Data

US 2005/0092690 A1 May 5, 2005

Related U.S. Application Data

(62) Division of application No. 10/253,139, filed on Sep. 24, 2002, now Pat. No. 7,011,751.

(51) Int. Cl.
*C02F 1/76* (2006.01)

(52) U.S. Cl. .................. 210/739; 210/743; 210/754

(58) Field of Classification Search ................ 210/199, 210/743, 739, 749, 754, 756
See application file for complete search history.

(56) References Cited

U.S. PATENT DOCUMENTS

| | | | | |
|---|---|---|---|---|
| 2,124,307 A | | 7/1938 | Mewborne | |
| 3,760,829 A | * | 9/1973 | Schuk et al. ................. | 137/93 |
| 3,980,435 A | | 9/1976 | Wimberley | |
| 4,435,291 A | * | 3/1984 | Matsko ...................... | 210/739 |
| 4,470,907 A | | 9/1984 | Sencza | |
| 4,855,061 A | * | 8/1989 | Martin ....................... | 210/709 |
| 5,004,696 A | | 4/1991 | Clinkenbeard | |
| 5,096,589 A | | 3/1992 | Blind et al. | |
| 5,474,938 A | | 12/1995 | Jadesjo et al. | |
| 5,565,619 A | | 10/1996 | Thungstrom et al. | |
| 5,618,440 A | * | 4/1997 | Mason ...................... | 210/716 |
| 5,719,100 A | * | 2/1998 | Zahradnik et al. .......... | 502/417 |
| 5,753,106 A | | 5/1998 | Schenck | |
| 5,902,749 A | | 5/1999 | Lichtwardt et al. | |
| 5,993,671 A | * | 11/1999 | Peltzer ....................... | 210/739 |
| 6,113,853 A | | 9/2000 | Nakamura et al. | |
| 6,125,481 A | * | 10/2000 | Sicilano ....................... | 4/509 |
| 6,267,878 B1 | * | 7/2001 | Kerchouche et al. ...... | 210/96.1 |
| 6,346,198 B1 | | 2/2002 | Watson et al. | |
| 6,436,345 B1 | * | 8/2002 | Roensch et al. ............. | 422/37 |
| 6,458,268 B1 | * | 10/2002 | Grandprey et al. ........ | 210/96.1 |

* cited by examiner

*Primary Examiner*—Frank M. Lawrence
(74) *Attorney, Agent, or Firm*—E J Asbury III, LLC

(57) ABSTRACT

A water treatment system for reducing the level of bacteria in a flow of water by creating an environment favorable for aerobic bacteria and unfavorable for anaerobic bacteria is disclosed. The system may include a method including intaking a flow of water, lowering a pH level of the flow of water to a predetermined range of pH levels, and adding sodium chlorite to the flow of water after lowering the pH level to the predetermined range of pH levels for producing chlorine dioxide. The sodium chlorite is added in an amount sufficient to produce a residual amount of sodium chlorite that does not produce chlorine dioxide, and the flow of water is outputted to the point of use with a residual amount of chlorine dioxide. The system may include an apparatus for carrying out the method of the invention.

17 Claims, 3 Drawing Sheets

WATER TREATMENT SYSTEM

REFERENCE TO RELATED APPLICATION

This application is a divisional patent application of U.S. patent application Ser. No. 10/253,139, filed Sep. 24, 2002, now U.S. Pat. No. 7,011,751, issued Mar. 14, 2006.

BACKGROUND OF THE INVENTION

1. Field of the Invention

The present invention relates to water treatment systems and more particularly pertains to a new and simplified water treatment system for reducing the level of bacteria in a flow of water by creating an environment favorable for aerobic bacteria and unfavorable for anaerobic bacteria.

2. Description of the Prior Art

The use of water treatment systems is known in the prior art. Many known water treatment systems mix constituent chemicals together (sometimes forming a gaseous substance) prior to mixing the resulting combination of the chemicals with the water at a single location, and typically in such systems three pumps are employed for pumping the constituent chemicals and combinations.

In these respects, the water treatment system according to the present invention substantially departs from the conventional concepts and designs of the prior art, and in so doing provides an apparatus and method primarily developed for the purpose of reducing the level of bacteria in a flow of water by creating an environment favorable for aerobic bacteria and unfavorable for anaerobic bacteria.

SUMMARY OF THE INVENTION

In the most general sense, the system of the invention is directed to creating in a flow of water an environment favorable for aerobic bacteria and unfavorable for anaerobic bacteria.

The present invention contemplates a system including a method for treating water and a suitable apparatus for carrying out the method of the invention, although other apparatus may also be suitable for carrying out the method.

Significantly, one aspect of the method includes lowering the pH level of the flow of water to a level, or range of levels, that is sufficient to produce a relatively acidic water environment, and adding sodium chlorite to the flow of water so that the sodium chlorite is activated to form, or converted into, chlorine dioxide (and other by products) for killing various undesirable bacterial elements that may be present in the water, such as, for example, *E-coli*, salmonella, cryptosporidium, etc. In at least one embodiment of the invention, the range of suitable pH levels is between approximately 5.5 and approximately 6.5.

Another aspect of the method contemplates adding or injecting sodium chlorite into the flow of water at a location relatively close to the location in the flow of water where the pH of the water is lowered into the desired range, and in some embodiments of the invention this addition of sodium chlorite is performed generally as close as possible to the location of pH lowering. In at least one embodiment of the invention, the location of sodium chlorite addition to the flow of water is less than approximately one foot (approximately 30 cm) from the location of pH lowering, which may comprise, for example, the point of injecting a product that lowers the pH of the flow of water.

Yet another aspect of the method of the invention contemplates creating an acidic water environment sufficient to cause conversion of much of the added sodium chlorite to chlorine dioxide (and other byproducts), but generally insufficient to cause conversion of all of the sodium chlorite to chlorine dioxide in the proximity of the location of addition of the sodium chlorite to the flow of water. Preferably, a portion of the sodium chlorite added to the flow of water remains unconverted at the point of use of the water, so that after ingestion of the water, a portion of the sodium chlorite is also ingested into the stomach or gut of the end user, and contributes to control of bacteria in the relatively acidic environment of the stomach of the end user of the water. In at least one embodiment of the invention, the residual level of chlorine dioxide in the flow of water at the point of use is in the range of approximately 0.2 PPM to approximately 0.8 PPM.

With regard to the apparatus aspects of the invention, one embodiment includes a conduit with an inlet end and an outlet end for carrying a flow of water moving in a direction of flow extending from the inlet end to the outlet end. Flow measuring means may be provided for detecting a rate of water flow through the conduit. A first fluid injection means may be provided for adjustably injecting a first fluid into the flow of water, with the first fluid injection means being in fluid communication with the flow of water through the conduit. A second fluid injection means may be provided for adjustably injecting a second fluid into the flow of water separately of the injection of the first fluid, with the second fluid injection means also being in fluid communication with the flow of water through the conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
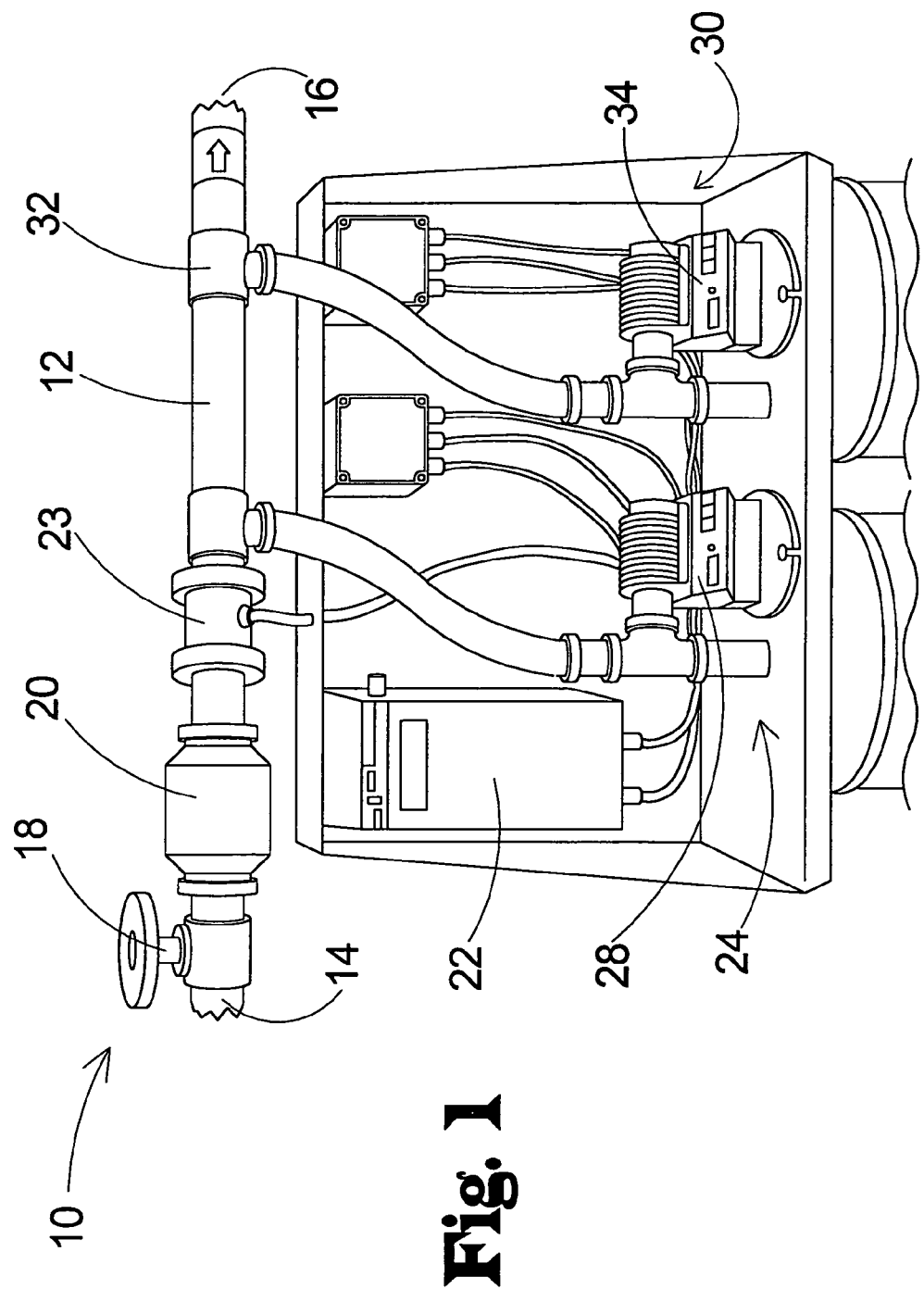
FIG. 1 is a schematic front view of a water treatment apparatus of the system according to the present invention.
Figure 2:
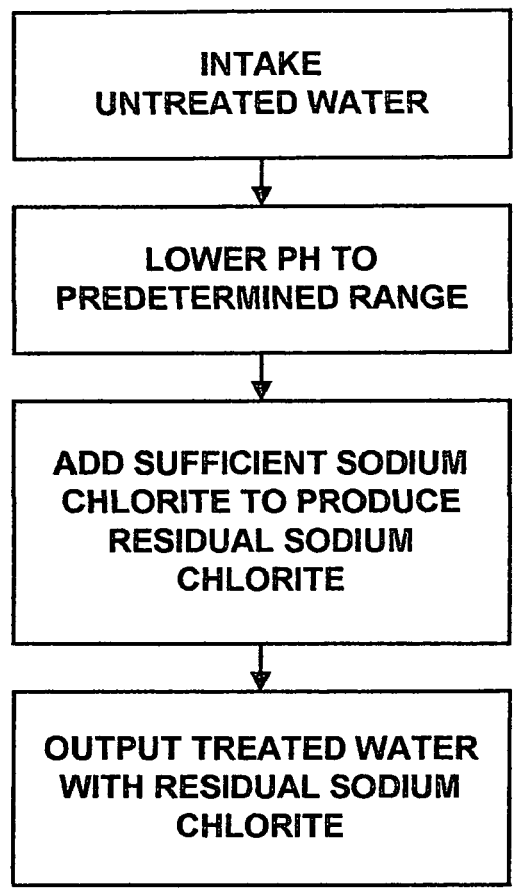
FIG. 2 is a schematic flow diagram of the method the present invention.
Figure 3:
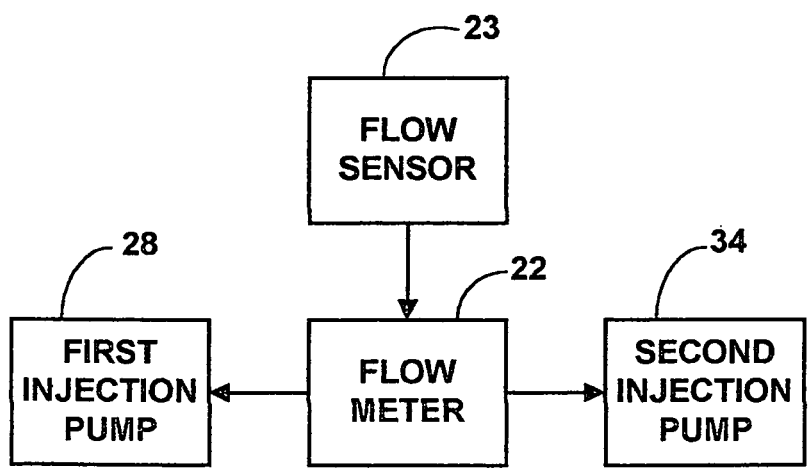
FIG. 3 is a schematic diagrammatic view of the signal paths of the present invention.
Figure 4:
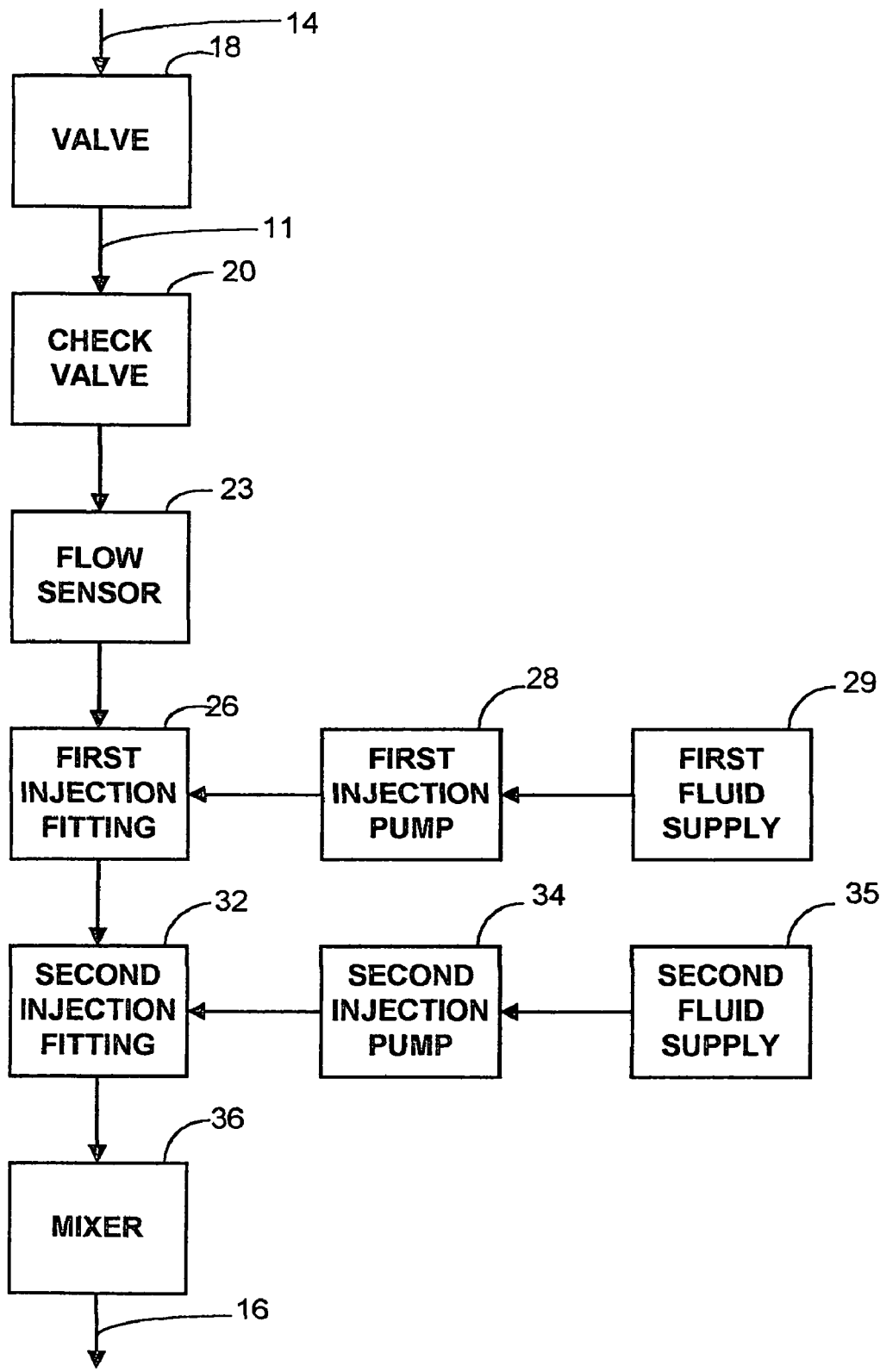
FIG. 4 is a schematic diagrammatic view of the fluid paths of the present invention.

With reference now to the drawings, and in particular to FIGS. 1 through 4 thereof, a new water treatment system embodying the principles and concepts of the present invention and generally designated by the reference numeral 10 will be described.

As best illustrated in FIGS. 1 through 4 and described below, the water treatment system 10 generally includes a method of continuously treating a flow of water (or optionally another fluid), and a means or apparatus for treating the water according to aspects of the method of the invention.

The aspects of a suitable apparatus, or water treatment assembly 10, for performing the method aspects of the invention will first be described. The water treatment assembly 10 may include a conduit 12 with an inlet end 14 and an outlet end 16 for carrying a flow of water moving in a direction of flow extending from the inlet end of the conduit to the outlet end of the conduit.

In one embodiment of the invention, a valve 18 is provided for controlling flow through the conduit. The valve 18 may be mounted on the conduit 12 at a location that is generally toward the inlet end 14 of the conduit. Illustratively, the valve 18 may comprise a ball valve, although other suitable valve types may be used. A check valve 20 may also be provided for resisting flow of water in a direction from the outlet end 16 toward the inlet end 14 of the conduit 12. The check valve 20 may be mounted on the conduit 12 toward the inlet end 14 of the conduit 12, and may be mounted between the valve 18 and the outlet end 16 of the conduit, but before the fluid injection means (described below) in the direction of the flow of water through the conduit, so that treated water is blocked from flowing out of the inlet end 14 back towards the supply of water.

The water treatment assembly 10 may also include means for measuring flow through the conduit 12 to detect a rate of water flow through the conduit. The flow measuring means may be located on the conduit 12 toward the inlet end 14 of the conduit, and may be located after the valve 18 and check valve 20 (if such are included in the water treatment assembly 10) but before the fluid injection means. The flow measuring means may comprise a flow meter 22 that is in communication with a flow sensor 23 mounted on the conduit 12. One suitable flow meter is the AUTOTROL 491 SM flow meter available from Osmonics Corporation of Minnetonka, Minn.

The water treatment assembly 10 also includes a first fluid injection means for adjustably injecting a first fluid into the flow of water. The first fluid injection means may comprise a first fluid injection apparatus 24 that is in fluid communication with the flow of water in the conduit 12. The first fluid injection apparatus 24 may be connected to the conduit 12 at a location after the flow meter 22 in the flow of water. The first fluid injection apparatus 24 may include a first injection fitting 26 mounted on the conduit 12 so that the first injection fitting is in fluid communication with the flow of water moving through the conduit. The first fluid injection apparatus 24 may also include a first injection pump 28 that is in fluid communication with the first injection fitting 26 for pumping the first fluid into the flow of water in the conduit 12 through the first injection fitting. An output of the first injection pump 28 may be suitably connected to the first injection fitting 26, and an input of the first injection pump may be suitably connected to a supply 29 of the first fluid. The first injection pump 28 may be programmable to output or inject the first fluid into the flow of water at a predetermined rate per unit (for example, parts per million (PPM)) of water flow. The injection of the first fluid at the predetermined rate per unit of water flow should also be responsive to a signal provided to the pump 28 by the flow meter 22 that indicates the actual water flow rate.

The water treatment assembly 10 may also include a second fluid injection means for adjustably injecting a second fluid into the flow of water. The second fluid injection means may comprise a second fluid injection apparatus 30 that is in fluid communication with the flow of water in the conduit 12. The second fluid injection apparatus 30 may be connected to the conduit 12 at a location after the flow meter 22 in the flow of water through the conduit, and should be located after the first injection means in the direction of the water flow. The second fluid injection apparatus 30 may include a second injection fitting 32 mounted on the conduit so that the second injection fitting is in fluid communication with the flow of water through the conduit. The second fluid injection apparatus 30 may also include a second injection pump 34 that is in fluid communication with the second injection fitting 32 for pumping the second fluid into the flow of water in the conduit 12 through the second injection fitting. An output of the second injection pump 34 may be suitably connected to the second injection fitting 32, and an input of the second injection pump may be suitably connected to a supply 35 of the second fluid. The second injection pump 34 may also be programmable to output or inject the second fluid into the flow of water based on a flow rate signal provided to the pump 34 by the flow meter 22.

In one illustrative embodiment of the invention, each of the injection pumps may be of the same general type, such as, for example, a solenoid-driven metering pump. One such type of pump is the PZ and PZi series of pumps that may be obtained from Tacmina Corporation of Osaka Japan.

The water treatment assembly 10 may also include means for continuously facilitating the mixing of the flow of water with the first fluid and the second fluid added to the flow of water. In one embodiment of the invention, the mixing means comprises a mixer 36 which includes a plurality of vanes that are located on an interior of the conduit 12 near the outlet end 16 of the conduit, although other suitable active or passive mixing means may be employed.

The water treatment assembly 10 may also include means for controlling the injection of the first fluid by the first fluid injecting apparatus 24 and injection of the second fluid by the second fluid injection apparatus 30 into the flow of water in the conduit 12 based upon the rate of flow of water as measured by the flow meter 22. In one embodiment of the invention, the means for controlling injection may be incorporated into the flow meter 22 and the injection pumps 28, 34, and the connections between these elements. The flow meter 22 may provide an electrical signal to each of the injection pumps 28, 34 that varies with the rate of the flow of water through the conduit 12 as measured or detected by the flow sensor 23. Additionally, each of the injection pumps 28, 34 may be set or calibrated to inject the respective fluid at a predetermined rate per unit water flow (to achieve a desired PPM) based on the rate of water flow through the conduit as measured by the flow meter. The predetermined rates for each of the first and second fluids may be entered or programmed into the respective first 28 and second 34 pumps based on the characteristics of the water detected by periodic testing of the water.

In the method aspect of the invention, a flow of water may be treated according to the inventive method using, for example, the water treatment assembly described above or other suitable apparatus. The water treatment assembly may be provided or situated in a suitable location for treating a substantially continuous, or even intermittent, flow of water through the conduit of the assembly. The inlet end of the conduit may be connected directly or indirectly to a supply of relatively untreated water, such as a well, and the water may be pumped from the supply to the conduit by a pump thus producing the flow of water. Various types of filtration of the water may optionally also be performed on the flow of water prior to the introduction of the water into the inlet end 14 of the conduit. The outlet end 16 may be connected directly or indirectly to the point of use of the water.

The method of the invention may include performing an initial set up for the water treatment assembly 10 by analyzing a sample of the water to be treated on an ongoing basis by the water treatment system. The initial set up step may include detecting a pH level of the water to be treated by the water treatment assembly. It is preferred that the detection of the pH level of the water is performed on an ongoing intermittent basis, such as, for example, at least twice a week, but more frequent testing may be necessary if the characteristics of the water is known to vary significantly over time.

As part of the initial set up, the untreated water may also be tested for other characteristics, such as elements and compounds. In one embodiment of the invention, the characteristics tested include iron, manganese, sulfur, calcium, nitrates, arsenic, and sodium. The untreated water may also be tested for the presence of organisms such as coliform bacteria. The presence of such items is typically determined, for example, in levels of parts per million (PPM). The water may also be tested after treatment for residual levels of various characteristics, and such testing may be carried out using, for example, the Chlorine Dioxide Tester available from Chemtrics of Charleston, Va. It should be realized that the rates of adding the first and second fluids may be determined by testing the untreated water and adjusting the rates of the addition of the first and second fluids, or by testing water that has been treated at initial rates and then adjusting the initial rate appropriately until testing of the treated water results in the desired characteristics.

The initial set up step may also include determining a rate for adding the first fluid to the flow of water based on the rate of water flow, and also determining a rate for adding the second fluid to the flow of water based on the rate of water flow. The rate of adding each of the first and second fluids is generally based on the pH level, mineral level, and bacteria level that are measured in the water to be treated.

The method of the invention includes measuring a rate of water flow through the conduit, and the flow measurement is preferably performed on a continuous basis as the system operates, so that fluctuations in the flow rate of water through the water treatment assembly do not result in too much or too little of the first and second fluids being added to the flow of water as the fluctuations occur. It should be realized that the measurement of the water flow rate may not necessarily be performed by a flow meter, and that other means may be employed to activate the injection pumps, such as, for example, the use of signals generated by a pump that is pumping the water from the supply to the water treatment assembly to establish a flow rate. The use of the flow meter is preferred for creating a compact, generally self-contained water treatment assembly that does not rely upon various external systems for operation.

The method of the invention may include injecting the first fluid into the flow of water at a rate according to the quantity of water moving through the conduit, to thereby increase the relative acidity of the water and bring the pH level of the water into a predetermined range. In one embodiment of the invention, the predetermined range of pH levels is between approximately 5.5 and approximately 6.5, inclusive. (It should be understood that small variations outside of this range may also provide the benefits of the invention.) The first fluid may comprise an acid substance for increasing the relative acidity of the flow of water when injected into the flow of water, and thereby lowering the pH level of the water in the flow to a desirable level within a range of pH levels. The rate at which the first fluid is added or injected into the flow of water not only depends upon the rate at which the flow of water is moving through the conduit, but also upon the character of the particular substance being used as the first fluid. Typically, the supplier of the substance or product being used to lower the pH into the desired range will indicate the amount or rate at which the substance must be added to the flow of water to adjust the pH level of the untreated water to the desired pH level after the addition of the substance. One suitable substance for lowering the pH of the water flow is carbonyl diamide sulfate which is included in a product available under the tradename "VEROX ACTIVATOR" from The Verox Group, LLC, 45 Henderson Road, Beverly, Mass. 01915 or from Eagle Systems of Calhoun, Ga. Other substances or products may also be suitable for lowering the pH of the flow of water into the desired range of pH levels.

For example, the VEROX Activator product may be added to the flow of water at a rate of approximately 1 PPM to approximately 5 PPM. Generally, if a relatively higher concentration of the minerals and organisms is detected in the untreated water, then the rate of adding the VEROX Activator is preferably closer to 5 PPM, and if relatively lower concentrations of minerals and organisms is detected, then the rate of adding the VEROX Activator is preferably closer to 1 PPM.

The method of the invention may also include injecting the second fluid into the flow of water after the injection of the first fluid into the flow of water at a rate that corresponds to the rate water flow through the conduit. In one embodiment of the invention, the addition of the second fluid to the flow of water occurs at a location that is relatively close to the location of the addition of the first fluid, and may be at a location that is less than approximately one foot (approximately 30 cm) from the location of adding the first fluid, although a distance of up to approximately 100 cm may be used. The most preferred second fluid comprises sodium chlorite. The most preferred method of the invention contemplates adding the sodium chlorite to the flow water at a rate that exceeds the amount sodium chlorite that can be completely converted into chlorine dioxide (and other byproducts) so that a residual amount of sodium chlorite remains in the water at the point of use. The rate of adding sodium chlorite to achieve the desired residual will vary with the characteristics of the water, including the pH level to which the water is lowered, and may have to be repeatedly adjusted until the desired residual amount results in the treated water. In one preferred embodiment of the invention, the residual amount of chlorine dioxide in the water at the point of use is in the range of approximately 0.2 PPM to approximately 0.8 PPM. It has been found that this residual level of chlorine dioxide in the stomach of the user of the water helps to control bacteria in the stomach, including *E-coli*, salmonella, cryptosporidium, etc.

Finally, the method of the invention may also include the step of disturbing the flow of water through the conduit in a manner that produces mixing of the flow of water with the first and second fluids in the conduit to facilitate the conversion of sodium chlorite to chlorine dioxide.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of treating water for a point of use, comprising:
    intaking a flow of water;
    lowering a pH level of the flow of water to a predetermined range of pH levels;
    adding sodium chlorite to the flow of water after lowering the pH level to the predetermined range of pH levels for producing chlorine dioxide, the sodium chlorite being added in an amount sufficient to produce a residual amount of sodium chlorite that does not produce chlorine dioxide; and
    outputting the flow of water to the point of use with a residual amount of sodium chlorite.

2. The method of claim 1 wherein the predetermined range of pH levels is between approximately 5.5 and approximately 6.5, inclusive.

3. The method of claim 1 wherein the step of lowering the pH level of the flow of water comprises injecting a first fluid for increasing the relative acidity of the flow of water.

4. The method of claim 3 wherein the step of adding sodium chlorite includes injecting sodium chlorite into the flow of water separate from the injection of the first fluid into the flow of water.

5. The method of claim 4 wherein the step of injecting sodium chlorite is performed at a location in the flow of water less than approximately 30 centimeters from a location of injection of the first fluid into the flow of water.

6. The method of claim 1 wherein the step of outputting the flow of water includes outputting the flow of water with a residual level of chlorine dioxide in the range of approximately 0.2 parts per million to approximately 0.8 parts per million, inclusive.

7. A method of treating water, comprising:
    providing a water treatment assembly comprising a conduit with an inlet end and an outlet end for carrying a flow of water moving in a direction of flow extending from the inlet end to the outlet end, flow measuring means for detecting a rate of water flow through the conduit, a first fluid injection means for adjustably injecting a first fluid into the flow of water, and a second fluid injection means for adjustably injecting a second fluid into the flow of water;
    performing an initial set up for the water treatment assembly on a sample of water to be treated by the water treatment system, wherein performing the initial set up step comprises:
        detecting a pH level of water to be treated by the water treatment assembly;
        detecting a mineral level in the water to be treated; and
        detecting a bacteria level in the water to be treated;
    determining a rate of first fluid addition and a rate of second fluid addition to the flow of water based upon a unit rate of water flow through the conduit;
    measuring a rate of the flow of water through the conduit;
    bringing a pH level of the flow of water substantially into a predetermined range by injecting the first fluid into the flow of water at a rate according to the rate the flow of water moving through the conduit; and
    injecting the second fluid into the flow of water at a rate according to the rate of water moving through the conduit, the injection of the second fluid occurring at a location in the flow of water after the injection of the first fluid into the flow of water.

8. The method of claim 7 wherein the step of injecting comprises adding the second fluid to the flow of water through the conduit at a location that is less than one foot from the location of adding the first fluid to the flow of water through the conduit.

9. The method of claim 7 wherein the step of injecting the first fluid into the flow of water includes adding an acid substance to the flow of water for decreasing the pH of the flow of water.

10. The method of claim 7 wherein the step of detecting a pH level includes performing the detection of the pH level of water to be treated on a repetitive, intermittent basis.

11. The method of claim 7 additionally comprising disturbing the flow of water through the conduit in a manner that produces mixing of the flow of water with the first and second fluids in the conduit.

12. A method of treating water, comprising:
    providing a water treatment assembly comprising a conduit with an inlet end and an outlet end for carrying a flow of water moving in a direction. of flow extending from the inlet end to the outlet end, flow measuring means for detecting a rate of water flow through the conduit, a first fluid injection means for adjustably injecting a first fluid into the flow of water, and a second fluid injection means for adjustably injecting a second fluid into the flow of water;
    performing a set up for the water treatment assembly on water to be treated by the water treatment system, wherein performing the initial set up step comprises:
        detecting a pH level of water to be treated by the water treatment assembly; and
        detecting a mineral level in the water to be treated;
    determining a rate of first fluid addition and a rate of second fluid addition to the flow of water based upon a unit rate of water flow through the conduit;
    measuring a rate of the flow of water through the conduit;
    bringing a pH level of the flow of water substantially into a predetermined range by injecting the first fluid into the flow of water at a rate according to the rate the flow of water moving through the conduit; and
    injecting the second fluid into the flow of water at a rate according to the rate of water moving through the conduit, the injection of the second fluid occurring at a location in the flow of water after the injection of the first fluid into the flow of water.

13. The method of claim 12 wherein the step of performing a set up for the water treatment assembly additionally comprises detecting a bacteria level in the water to be treated.

14. The method of claim 12 wherein the step of injecting comprises adding the second fluid to the flow of water through the conduit at a location that is less than one foot from the location of adding the first fluid to the flow of water through the conduit.

15. The method of claim 12 wherein the step of injecting the first fluid into the flow of water includes adding an acid substance to the flow of water for decreasing the pH of the flow of water.

16. The method of claim 12 wherein the step of detecting a pH level includes performing the detection of the pH level of water to be treated on a repetitive, intermittent basis.

17. The method of claim 12 additionally comprising disturbing the flow of water through the conduit in a manner that produces mixing of the flow of water with the first and second fluids in the conduit.

* * * * *